United States Patent
Wirola et al.

(10) Patent No.: US 11,054,497 B2
(45) Date of Patent: Jul. 6, 2021

(54) HYBRID RADIO MAPS

(71) Applicant: HERE Global B.V., Eindhoven (NL)

(72) Inventors: Lauri Aarne Johannes Wirola, Tampere (FI); Henri Jaakko Julius Nurminen, Tampere (FI); Pavel Ivanov, Tampere (FI)

(73) Assignee: HERE Global B.V., Eindhoven (NL)

(*) Notice: Subject to any disclaimer, the term of this patent is extended or adjusted under 35 U.S.C. 154(b) by 0 days.

(21) Appl. No.: 16/825,496

(22) Filed: Mar. 20, 2020

(65) Prior Publication Data

US 2020/0300961 A1  Sep. 24, 2020

(30) Foreign Application Priority Data

Mar. 22, 2019 (EP) .................................. 19164572

(51) Int. Cl.
*G01S 5/02* (2010.01)
*H04W 64/00* (2009.01)

(52) U.S. Cl.
CPC .......... *G01S 5/0252* (2013.01); *G01S 5/0236* (2013.01); *H04W 64/003* (2013.01); *H04W 64/006* (2013.01); *G01S 2201/02* (2019.08)

(58) Field of Classification Search
CPC ........ G01S 5/0252; G01S 5/0236; G01S 5/02; G01S 5/0257; G01S 5/0278; G01S 19/48; G01S 5/0205; G01S 5/0263; G01S 5/0284; G01S 19/14; G01S 19/46; G01S 5/0242; G01S 5/20; G01S 11/02; G01S 11/04; G01S 11/06; G01S 19/42; G01S 19/425;
(Continued)

(56) References Cited

U.S. PATENT DOCUMENTS 5,978,744 A * 11/1999 McBride .................. G01S 5/02 33/320
8,350,758 B1   1/2013 Parvizi et al.
(Continued)

FOREIGN PATENT DOCUMENTS

EP    3 252 492 A1   12/2017
EP    3 418 763 A1   12/2018
(Continued)

OTHER PUBLICATIONS

"Coordinate Transformation" from GIS Fundamentals, by University of Minnesota, dated Jun. 2006 and archived on Jul. 12, 2017 (Year: 2017).*

(Continued)

*Primary Examiner* — Daniel Lai
(74) *Attorney, Agent, or Firm* — Alston & Bird LLP

(57) ABSTRACT

A method, performed by at least one apparatus, is provided that includes obtaining first radio map data. The first radio map data indicates geographic positions with respect to a first coordinate system. The method also obtains second radio map data. The second radio map data indicates geographic positions with respect to a second coordinate system. The method further includes identifying a transformation between the first coordinate system and the second coordinate system and applying the identified transformation at least to a part of the first radio map data and/or the second radio map data. A corresponding apparatus and computer readable storage medium are also provided.

20 Claims, 5 Drawing Sheets

(58) Field of Classification Search
CPC .. G01S 19/45; G01S 2201/01; G01S 2201/02;
G01S 5/00; G01S 5/0027; G01S 5/0247;
G01S 5/08; H04W 64/00; H04W 4/029;
H04W 4/33; H04W 64/003; H04W 4/80;
H04W 64/006; H04W 24/02; H04W 4/02;
H04W 4/021; H04W 4/025; H04W 4/38;
H04W 4/026; H04W 4/20; H04W 4/00;
H04B 17/318; H04B 17/27; H04B
17/309; H04B 17/327; H04B 17/336
See application file for complete search history.

(56) References Cited

U.S. PATENT DOCUMENTS

| | | | |
|---|---|---|---|
| 8,983,774 | B2 | 3/2015 | Gao et al. |
| 9,913,100 | B2 | 3/2018 | Agarwal et al. |
| 10,070,259 | B1 | 9/2018 | Ivanov et al. |
| 10,139,471 | B2 | 11/2018 | Ivanov et al. |
| 10,290,049 | B1* | 5/2019 | Xu .................. G06Q 30/0643 |
| 10,397,739 | B2 | 8/2019 | Ivanov et al. |
| 10,484,880 | B2 | 11/2019 | Syrjarinne et al. |
| 10,555,132 | B2 | 2/2020 | Ivanov et al. |
| 10,598,759 | B2 | 3/2020 | Ivanov et al. |
| 2013/0005297 | A1* | 1/2013 | Sanders .............. H04W 4/029 455/406 |
| 2014/0195148 | A1* | 7/2014 | Erignac .............. G05D 1/0282 701/445 |
| 2014/0341198 | A1 | 11/2014 | Han |
| 2016/0080911 | A1* | 3/2016 | Kay .................. G01S 5/0263 455/456.1 |
| 2016/0161592 | A1 | 6/2016 | Wirola et al. |
| 2016/0371394 | A1 | 12/2016 | Shahidi et al. |
| 2017/0370728 | A1* | 12/2017 | Kordari .............. G01C 21/206 |
| 2017/0371023 | A1 | 12/2017 | Syrjarinne et al. |
| 2018/0279067 | A1 | 9/2018 | Ivanov et al. |
| 2019/0120665 | A1* | 4/2019 | Blaha, Jr. ............. G01L 19/086 |

FOREIGN PATENT DOCUMENTS

| | | | |
|---|---|---|---|
| EP | 3 663 787 | A1 | 6/2020 |
| JP | 2003130680 | A * | 5/2003 |
| WO | WO 2016/086994 | A1 | 6/2016 |
| WO | WO 2016/087008 | A1 | 6/2016 |
| WO | WO 2018/153809 | A1 | 8/2018 |
| WO | WO 2018/158409 | A1 | 9/2018 |
| WO | WO 2018/172279 | A1 | 9/2018 |
| WO | WO 2019/228605 | A1 | 12/2019 |
| WO | WO 2019/228630 | A1 | 12/2019 |

OTHER PUBLICATIONS

European Search Report for Application No. EP 19164572.0 dated Nov. 7, 2019.
U.S. Appl. No. 16/769,194, filed Jun. 2, 2020; In re: Ivanov et al., entitled *Supporting a Selection of a Floor*.
U.S. Appl. No. 16/770,289, filed Jun. 5, 2020; In re: Ivanov et al., entitled *Supporting a Determination of Floor Heights*.
U.S. Appl. No. 16/817,725, filed Mar. 13, 2020; In re: Nurminen et al., entitled *Multi-Level Altitude Map*.

* cited by examiner $$T(D_{M1_i} \in M1) \to D'_{M1_i} \in M2$$

FIG. 4A $$\sum_i F(D'_{M1_i} \in M2) + \sum_j F(D_{M2_j} \in M2) \to RM$$

FIG. 4B

HYBRID RADIO MAPS

CROSS-REFERENCE TO RELATED APPLICATION

This application claims priority to European Application No. 19164572.0, filed Mar. 22, 2019, the entire contents of which are incorporated herein by reference.

FIELD OF THE INVENTION

The invention relates to the field of positioning. Particularly, the invention describes ways of generating, enhancing and updating radio maps, which can in particular be used for indoor positioning.

BACKGROUND OF THE INVENTION

Indoor positioning requires novel systems and solutions that are specifically developed and deployed for this purpose. The "traditional" positioning technologies, which are mainly used outdoors, i.e. satellite and cellular positioning technologies, cannot deliver such performance indoors that would enable seamless and equal navigation experience in both environments. The required positioning accuracy (2-3 m), coverage (~100%) and floor detection are challenging to achieve with satisfactory performance levels with the systems and signals that were not designed and specified for the indoor use cases in the first place.

Satellite-based radio navigation signals simply do not penetrate through the walls and roofs for the adequate signal reception and the cellular signals have too narrow bandwidth for accurate ranging by default.

Several indoor-dedicated solutions have already been developed and commercially deployed during the past years e.g. solutions based on technologies like pseudolites (GPS-like short-range beacons), ultra-sound positioning, BLUETOOTH or BLUETOOTH LE signals and WI-FI fingerprinting. What is typical to these solutions is that they require either deployment of totally new infrastructure (such as beacons or tags) or manual exhaustive radio surveying of the buildings including all the floors, spaces and rooms. This is rather expensive and will take a considerable amount of time to build the coverage to the commercially expected level, which can in some cases narrow the potential market segment to only a very thin customer base e.g. for health care or dedicated enterprise solutions. Also, the diversity of these technologies makes it difficult to build a globally scalable indoor positioning solution, and the integration and testing will become complex if a large number of technologies needs to be supported in the consumer devices, such as smartphones.

Examples of such manual data collection for radio maps is inter alia described in WO 2016/087008 A1, WO 2016/086994 A1, EP 3 252 492 A1, WO 2018/172279 A1, EP 3 418 763 A1, the disclosure of which is incorporated herein by reference in its entirety.

For an indoor positioning solution to be commercially successful it needs to be globally scalable, have low maintenance and deployment costs, and offer acceptable end-user experience. This can best be achieved, if the solution is based on an existing infrastructure in the buildings and on existing capabilities in the consumer devices. Accordingly, the indoor positioning needs to be based on technologies like WI-FI—and/or BLUETOOTH (BT)-technologies that are already supported in almost every smartphone, tablet, laptop and even in the majority of the feature phones. It is, thus, required to find a solution that uses such radio signals in such a way that makes it possible to achieve 2-3 m horizontal positioning accuracy, close to 100% floor detection with the ability to quickly build the global coverage for this approach.

One approach for radio-based indoor positioning models the radio environment (generated by e.g. WI-FI, BLUETOOTH or any similar radio signals) from observed radio measurements (e.g. received signal strength (RSS)-measurements) as 2-dimensional radio maps and is hereby able to capture the dynamics of the indoor radio propagation environment in a compressible and highly accurate way. This makes it possible to achieve unprecedented horizontal positioning accuracy with the radio signals only within the coverage of the created radio maps and also gives highly reliable floor detection.

In addition to the above described approach of manually radio surveying a region, huge volumes of indoor radio signal measurement data (so called fingerprints) can be harvested via the approach of crowdsourcing, if the consumer devices are equipped with the necessary functionality to enable the radio signal data collection, e.g. as an automatic background process, naturally with the end-user consent. It could also be possible to use volunteers to survey the sites (buildings) in exchange of reward or recognition and get the coverage climbing up globally in the places and venues important for the key customers. However, the technical challenges related to the harvesting, processing, redundancy, ambiguity and storing the crowd-sourced data need to be understood and solved first, before the radio map creation can be based on the fully crowdsourced data.

Examples of crowdsourcing data for radio maps is inter alia described in WO 2018/158409 A1, WO 2018/153809 A1, the disclosure of which is incorporated herein by reference in its entirety.

Both, the manual data collection and the crowdsourcing approach for generating a radio map, specifically for indoor positioning, have their advantages and disadvantages.

The manual data collection advantageously allows getting highly accurate positioning information (geo-referencing) for the radio measurements for the radio map creation. On the downside, the manual data collection requires a comparably laborious manual mapping, as the user needs to manually input the highly accurate positioning information. Moreover, the manual approach does not respond to changes in the radio environment unless a new manual data collection is performed.

The crowdsourcing approach advantageously allows for an automated data collection globally from a large amount of regions, cities and buildings. On the downside, this approach requires huge amounts of data—typically hundreds of millions of devices need to harvest the data. Further, in contrast to the manual approach, obtaining accurate data with reliable position information (geo-references) indoors is specifically challenging, because GNSS does not work indoors or has high errors and using inertial sensor quality is typically not adequate to provide sufficient sensor-based location estimates indoors.

Both approaches have their merits and challenges and, thus, one option would be to try to use both approaches when appropriate in order to provide the best performance with regard to accuracy, availability and total cost with maintenance.

However, using such a hybrid approach is not trivial and has its own challenges. A challenging situation arises, in particular when there is a region with both manually collected and crowd-sourced data. In such a case one could exclude one of the two types of data, for instance. However, this would lead to a loss of potentially valuable information, which cannot be taken into account anymore for generating the radio map.

Thus, in view of the above it is inter alia an object of the invention to provide methods and apparatuses for providing radio maps with an improved quality and precision, in particular with respect to indoor positioning.

SOME EXAMPLE EMBODIMENTS OF THE INVENTION

According to an exemplary aspect of the invention, a method is disclosed, performed by at least one apparatus, the method comprising:

obtaining first radio map data, the first radio map data indicating geographic positions with respect to a first coordinate system;

obtaining second radio map data, the second radio map data indicating geographic positions with respect to a second coordinate system;

identifying a transformation between the first coordinate system and the second coordinate system; and applying the identified transformation at least to a part of the first radio map data and/or the second radio map data.

The method may for instance be performed and/or controlled by an apparatus, for instance by a mobile device and/or a server, e.g. an apparatus according to the exemplary aspects, as described in more detail below.

According to a further exemplary aspect of the invention, an apparatus is disclosed comprising means for performing a method according to the exemplary aspect. The means of the apparatus may be implemented in hardware and/or software. They may comprise for instance at least one processor for executing computer program code for realizing the required functions, at least one memory storing the program code, or both. Alternatively, they could comprise for instance circuitry that is designed to realize the required functions, for instance implemented in a chipset or a chip, like an integrated circuit. In general, the means may comprise for instance one or more processing means such as a processor and a memory. Optionally, the apparatus may comprise various other components, like a communication interface, a network interface, a radio interface, a data interface, a user interface etc. For instance, the apparatus may comprise at least one processor and at least one memory including computer program code; the at least one memory and the computer program code configured to, with the at least one processor, cause the apparatus to at least perform a method according to the exemplary aspect of the invention.

The disclosed apparatuses according to any aspect of the invention may be a module or a component for a device, for example a chip. Alternatively, the disclosed apparatus according to any aspect of the invention may be a device, for instance a mobile device or a server. The disclosed apparatus according to any aspect of the invention may comprise only the disclosed components, for instance means, processor, memory, or may further comprise one or more additional components.

According to a further exemplary aspect of the invention, a computer program code is disclosed, the computer program code, when executed by a processor, causing an apparatus to perform the method according to the exemplary aspect. The computer program may be stored on a computer-readable storage medium, in particular a tangible and/or non-transitory medium. The computer readable storage medium could for example be a disk or a memory or the like. The computer program could be stored in the computer readable storage medium (e.g. according to the exemplary aspect of the invention described below) in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, a non-transitory computer readable storage medium is disclosed, in which computer program code is stored, the computer program code when executed by a processor causing at least one apparatus to perform the method according to the exemplary aspect. The storage medium may be a tangible storage medium, for example a tangible computer-readable storage medium. The storage medium may be a storage medium of a mobile device or server, for example an apparatus according to the exemplary aspects of the invention.

In the following, exemplary features and exemplary embodiments of all aspects of the present invention will be described in further detail.

In one example, the first and/or second radio map data may comprise or consist of a respective radio map itself. Alternatively, in another example, the first and/or second radio map data may be data which allows for creating or generating a respective radio map. Such data may in particular comprise or consist of radio fingerprints (e.g. comprising radio measurements and position information), as will be explained in further detail below.

In general, a radio map may be understood as a collection of radio models (or radio images) of radio nodes (e.g. access points) within a region. A radio map may in some examples include exact location information of respective nodes. In other examples, the location information may be less specific and may, for instance, only indicate a coverage area of a respective node. As such, the location information may be, broadly-speaking, described as a geographical reference for each node or the radio environment in a certain region in general. As mentioned above, radio map data may now be understood as data pertaining to such a radio map (e.g. either data constituting such a radio map or data allowing for creating such a radio map, such as radio fingerprints).

The first and/or second radio map data may pertain to a respective (first and/or second) geographic region. The first and second geographic regions may have an at least partial overlap. The region covered by the second radio map data may be larger than the region covered by the first radio map data. The region may in particular be or comprise a region of a structure (such as a building, for instance). Thus, the region may in particular (at least partly) be or comprise an indoor region and/or a multilayer region. In other words, the first and/or second radio map data may in particular (at least) pertain to a respective (in particular the same) structure.

The first radio map data may be radio map data of first type and the second radio map data may be radio map data of a (different) second type. As will be explained in more detail below, that the first and second radio map data is of a different type may in particular mean that the first and second radio map data may be based on (e.g. comprising or derived from) data having been collected through different sources or different data acquisition approaches.

The coordinate system may in particular be a geographic coordinate system enabling every location in a region or on Earth to be specified by a set of numbers, letters and/or symbols.

A transformation or coordinate transformation between coordinate systems may comprise mathematical rules which can be applied to coordinates in order to transform coordinates from system to another system. A transformation may comprise translation, rotation, shearing and/or scaling operations, for instance. A transformation may be described with a transformation matrix, for instance. Thus identifying a transformation may in particular comprise identifying appropriate transformation operations, e.g. one or more transformation matrices.

Typically, the transformation may be applied to only one of the first radio map data and the second radio map data. However, it may also be the case that certain transformation operations are applied to the first radio map data and that certain transformation operations are applied to the second radio map data.

After applying the identified transformation to the respective radio map data, the first radio map data and the second radio map data may be considered as (at least in part) residing in the same coordinate system. In other words, the first radio map data and the second radio map data then indicate geographic positions (at least in part) with respect to the same coordinate system.

The described approach has the advantage that both the first radio map data and the second radio map data, even if they at least in part pertain to the same geographic region and even though they use different coordinate systems, can be used for generating a radio map. Compared to an approach where either the first or the second radio map data is excluded, the present approach described herein has the effect of allowing a combination of the first and the second radio map data with the advantage of having a larger data basis for generating the radio map. Usually, such a combination would not be possible due to the incompatibilities between e.g. manually collected and crowdsourced radio data map. However, identifying an applying a transformation as described allows for such a combination of radio map data having advantageous effects such as improving the coverage and/or accuracy of the generated radio map.

According to an exemplary embodiment of the different aspects of the invention, the first radio map data at least in part is based on (e.g. comprises or is derived from) manually collected data and the second radio map data at least in part is based on (e.g. comprises or is derived from) crowdsourced data. This may in particular apply to the majority or all of the radio map data.

A manual data collection is in particular understood as a collection which involves at least a manual input of a user. Accordingly, manually collected data is in particular understood as data, the collection of which comprises at least a manual input of a user (e.g. during the collection). For instance, a manual data collection comprises a human-in-the-loop (HITL). Specifically with respect to radio map data, a manual user input may in particular be required for manually inputting position information (e.g. for the collection of radio fingerprints). A manually collected data may further have the property of a data that is purposefully, selectively and/or systematically collected. Also, manually collected data may be more accurate than crowdsourced data.

A data collection by means of crowdsourcing is in particular understood as a collection which is performed by a large group of users (such as thousands, hundred thousands, millions of users/devices or even more). The collection may in particular be performed automatically and a manual input of a user may not be required. Specifically with respect to radio map data, the position information (e.g. for the collection of radio fingerprints) may in particular be collected automatically without any manual user input. Crowdsourced data may further have the property of a data that is collected randomly, aimlessly and/or by chance. Also, crowdsourced data may be noisier than manually collected data.

More generally, it may also be the case, that the first radio map data at least in part is based on a first data collection technique and the second radio map data at least in part is based on a (different) second data collection technique.

While the first and the second coordinate system may use or indicate positions with respect to different references or different reference systems, they may also use or indicate positions with respect to the same reference or reference system. For instance, both coordinate systems may reference or use global coordinates, e.g. used by a GNSS. Still, also in the latter case, the two coordinate systems may be misaligned with respect to each other and a coordinate transformation may be needed.

Specifically for the case of manually collected data on the one hand and crowdsourced data on the other hand, there is noise and a lack of precise position information in the crowd-sourced radio map data and a coordinate system mismatch. Such a mismatch may be present when different references or reference systems are used, e.g. global coordinates may be used for the crowdsourced data and local indoor coordinates may be used for the manually collected data, but also when the same reference or reference system is used, e.g. both coordinate systems may use or reference the same global coordinates, such as used for a GNSS. For instance, like the crowdsourced data, the manually collected data may use an indoor map also in global coordinates, but the indoor map used in data collection may be located slightly off in (e.g. latitude and/or longitude) coordinates resulting in a mismatch. Therefore, the suggested approach is particularly advantageous for this case, because the coordinates used for the one type of data can be mapped to the coordinates used for the other type data.

Accordingly, the most crucial task is to find a coordinate transformation between the manually collected radio map data coordinate system (e.g. an indoor map coordinate system using the coordinates Latitude, Longitude, Floor) and the crowdsourced radio map data coordinate system (e.g. a global coordinate system using GNSS coordinates Latitude', Longitude', Altitude). After the transformation between the two coordinate systems is found, the first and second radio map data can be merged.

According to an exemplary embodiment of the different aspects of the invention, the first radio map data is based on (e.g. comprises or is generated from) first radio fingerprints and the second radio map data is based on (e.g. comprises or is generated from) second radio fingerprints. In particular, the first radio fingerprints at least in part may be manually collected radio fingerprints and the second radio fingerprints at least in part may be crowdsourced radio fingerprints.

According to an exemplary embodiment of the different aspects of the invention, the first radio fingerprints comprise first radio measurements and position information indicating geographic positions at which the first radio measurements were taken with respect to the first coordinate system, and the second radio fingerprints comprise second radio measurements and position information indicating geographic positions at which the second radio measurements were taken with respect to the second coordinate system.

The first and second radio fingerprints thus comprise radio measurements with associated position information. The respective position information indicate the respective geographic positions with respect to the region to which the radio map data pertains.

As described, in case of the (first) radio map data being based on manually collected data, particularly the position information may require a user interaction for being acquired at the collecting device. For instance, the user may need to manually confirm or input the horizontal and/or vertical location, e.g. by indicating the current position on map (e.g. an indoor map) displayed to the user. For instance the user may need to manually indicate the level or floor as an example of vertical position information. The position information may thus be acquired with respect to the first coordinate system, which may be a local coordinate system of the (indoor) map shown to the user.

As described, in case of the (second) radio map data being based on crowdsourced data, the position information may be acquired automatically and may not require any user interaction for being acquired at the collecting device. For instance, the position information may be acquired by the collecting device based on a global navigation satellite system (GNSS) and/or on one or more sensors (e.g. a motion sensor, an acceleration sensor) of the collecting device. Examples of global navigation satellite system (GNSS) are "Global Positioning System" (GPS), "Galileo", "Global Navigation Satellite System" (i.e. "Globalnaja Nawigazionnaja Sputnikowaja Sistema", GLONASS), "BeiDou Navigation Satellite System" (BDS), or "Quasi-Zenith Satellite System" (QZSS), to name some examples. The position information may thus be acquired with respect to the second coordinate system, which may be a global coordinate system.

In case of both, the first radio fingerprints and the second radio fingerprints, the radio measurements of the respective radio fingerprints may nevertheless be acquired by the collecting device in the same way and in particularly automatically. The respective radio measurements of the first and second radio fingerprints comprise information on the radio environment. Examples of such information are given below.

According to an exemplary embodiment of the different aspects of the invention, the first radio measurements and/or the second radio measurements each comprise one or more of
  an identifier of a radio node emitting an observed radio signal;
  information on a received signal strength of an observed radio signal;
  information on path losses of an observed radio signal;
  information on a timing measurement of an observed radio signal; and/or
  information on an angle of arrival of an observed radio signal.

Generally, the radio measurements may be based on radio signals of a cellular communication system or a non-cellular communication system. Examples of a cellular communication system are a second generation (2G, for instance the Global System for Mobile Communication (GSM), the General Packet Radio System (GPRS), the Enhanced Data Rates for GSM Evolution (EDGE) or the High Speed Circuit-Switched Data (HSCSD)), third generation (3G, for instance the Universal Mobile Telecommunication System, UMTS, WCDMA, TD-SCDMA or CDMA-2000), fourth generation (4G, for instance the Long Term Evolution, LTE system, the LTE Advanced (LTE-A) system or the IEEE 802.16m WiMAX system) or fifth generation (5G) communication system. Examples of a non-cellular communication system are a system according to the IEEE 802.11 standard (WLAN system), a BLUETOOTH or BLUETOOTH LE system, a ZIGBEE system, a radio-frequency identification (RFID) system, a broadcasting network such as for instance Digital Video Broadcasting (DVB), Digital Audio Broadcasting (DAB) or Frequency-Modulated (FM)/Amplitude-Modulated (AM) system, a Near Field Communication (NFC) system, etc.

A cellular communication system may for instance be characterized by a basically seamless pavement of a geographical area (usually in the order of at least hundreds or thousands of square kilometers) with cells in which coverage is provided by respective nodes of the communication system that are operated by the same operator, which network may for instance support communication handover between cells. Consequently, a non-cellular communication system may be characterized as a communication system that does not have all of these properties.

Accordingly, an identifier of a radio node may for instance be a cell identifier in case of a cellular communication system (e.g. UTRAN Cell ID (UC-ID) or an LTE Cell Identity), or a service set identifier (e.g. an SSID or BSSID) or a medium access control (MAC) address in case of a non-cellular communication system. Accordingly, a radio node may be a cellular radio node or an access point or a BLUETOOTH beacon, for example.

Information on a received signal strength may for instance be a received signal strength indication RSSI or physical Rx level. Information on path losses may be a path loss exponent, for instance. Information on a timing measurement may comprise information representative of a propagation delay, a timing advance (TA) or round-trip time (RTT). Information on an angle of arrival (AoA) of an observed radio signal may be obtained via the time difference of arrival (TDOA), for instance.

According to an exemplary embodiment of the different aspects of the invention, the position information of the first radio fingerprints and/or of the second radio fingerprints comprise one or more of
  horizontal position information;
  vertical position information;
  information representative of a latitude;
  information representative of a longitude;
  information representative of an altitude; and/or
  information representative of a floor index.

Latitude and longitude are examples of horizontal position information. The horizontal position information may indicate an absolute position (such as longitude and latitude) or a relative position (e.g. with reference to a local map, e.g. an indoor map). An altitude or a floor index are examples of vertical position information. The vertical position information may rely on a continuous (e.g. altitude) or discrete (e.g. floor index) domain. An altitude may be an absolute altitude (e.g. above a reference ellipsoid (e.g. WGS-84) or above mean see level) or a relative altitude (e.g. above ground).

If position information of the first and/or second radio fingerprints is acquired with reference to or utilizes a certain reference system, this is typically also the coordinate system used for the respective radio map data.

According to an exemplary embodiment of the different aspects of the invention, the first radio map data enables estimating a geographic position of a mobile device at least in part with a higher accuracy than the second radio map data.

Thus, at least for some part of the region, to which the radio map data pertains, a higher accuracy can be obtained. Compared to the second radio map data, the first radio map data may in particular enable estimating a geographic position of a mobile device with a higher accuracy on average. This may be due to the fact that the position information of the first radio fingerprints at least in part has a higher accuracy than the position information of second radio fingerprints. This may in particular be true for an indoor region, because for instance manually input position information (as it can be used for instance for the first radio map data) typically has a higher accuracy than position information based on e.g. GNSS (as it can be used for instance for the second radio map data).

According to an exemplary embodiment of the different aspects of the invention, the first coordinate system and the second coordinate system use global coordinates.

In particular, the position information of the first radio fingerprints may indicate positions at least in part with respect to global coordinates (e.g. of a global geographic coordinate system, e.g. with reference to a reference ellipsoid, e.g. within a local map, e.g. an indoor map). In particular, the position information of the second radio fingerprints may also indicate positions at least in part with respect to global coordinates (e.g. of a or the same global geographic coordinate system, e.g. with reference to a reference ellipsoid). Even though the first and second coordinate systems may both use or reference global coordinates or use the same format of a global coordinate system, these two coordinate systems may still be misaligned to each other (e.g. because the first coordinate systems is erroneously aligned within the local map used by the first radio map data).

However, it may also be the case, that e.g. the first and/or the second coordinate system use a different reference, e.g. global coordinates in one case and local coordinates in the other case.

According to an exemplary embodiment of the different aspects of the invention, the method further comprises:
  identifying a common region covered by the first radio map data and the second radio map data, the first radio map data indicating geographic positions in the common region with respect to the first coordinate system and the second radio map data indicating geographic positions in the common region with respect to the second coordinate system.

As explained above, particularly for the common regions comprising both, first radio map data and second radio map data, it is challenging to generate a radio map based on both radio map data. However, due to the approach described herein the first and the second radio map data can be utilized in case of mismatching coordinate systems. The transformation may be specifically determined for and/or applied to the identified region. Thus, the transformation may be a region-specific transformation. In case the region is a structure (e.g. building), the transformation may be a structure- (e.g. building-) specific transformation.

According to an exemplary embodiment of the different aspects of the invention, identifying of a common region covered by the first radio map data and the second radio map data comprises comparing radio node identifiers from the first radio map data with radio node identifiers from the second radio map data.

In one example, some or all radio node identifiers may be extracted from the first (or second) radio map data. Then, the second (or first) radio map data may be searched for matching radio node identifiers. When a larger cluster of matching radio node identifiers is found, it can be derived that the region is also covered by the second (or first) radio map data.

According to an exemplary embodiment of the different aspects of the invention, identifying a transformation between the first coordinate system and the second coordinate system comprises identifying a common feature present in the first radio map data and the second radio map data.

As the radio map data describes the radio environment of the region to which the radio map data pertains, the common feature may in particular be understood to be a radio feature or a radio environment feature. A common feature may in particular be a pattern, distribution, characteristic and/or property present in both the first and second radio map data. The common feature may in particular be a spatial or geographic feature, in particular a spatial or geographic radio feature, such as a spatial or geographic pattern of radio nodes or a spatial or geographic position or shape of a coverage area. More generally, the common feature may be such that it facilitates identifying the transformation (e.g. a relative displacement, shearing, rotation and/or scaling of first and second coordinate system with respect to each other).

According to an exemplary embodiment of the different aspects of the invention, the common feature is a spatial or geographic feature and in particular pertains to one or more of:
  one or more radio node locations;
  one or more signal strength fields;
  one or more radio coverage areas; and/or
  one or more altitude maps.

For instance, the common feature may be a specific radio node locations or a specific pattern of radio node locations, which can be found in both the first and second radio map data. For instance, the common feature may be a specific location or shape of an RSSI field. For instance, the common feature may be a specific location or shape of a radio coverage area of a certain radio node. Examples of an altitude map feature are a shape of an altitude map or the altitude or number of layers of a multilayer altitude map associated with respective radio map data, for instance. For instance, a feature of an altitude map may be a corner point of a building indicated by the altitude map and identifiable in both the first and second radio map data.

According to an exemplary embodiment of the different aspects of the invention, identifying a transformation between the first coordinate system and the second coordinate system comprises a mathematical optimization method. Therein, the transformation between the first and second coordinate system is found, which optimally maps the common feature onto each other. An example of a mathematical optimization method is a least square method. Other suitable optimization methods for identifying the transformation may be used as well.

According to an exemplary embodiment of the different aspects of the invention, the method further comprises:
  generating a hybridized radio map based on the first radio map data and the second radio map data.

For this, the first and second radio map data may be combined or merged. For instance, the first or second radio map data may be inserted into the respective other radio map data. For instance, two radio maps (as an example of radio map data) may be combined or merged in order to generate the hybridized radio map. Alternatively the first and second radio fingerprints (as another example of radio map data) may be combined or merged in order to generate the hybridized radio map based on the combined set of radio fingerprints. Also, a radio map (as an example of radio map data) may be enhanced by inserting radio fingerprints of the respective other radio map data into the radio map.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE DRAWINGS

FIG. 4A is a schematic illustration of applying an identified transformation to at least a part of the first radio map data;

FIG. 4B is a schematic illustration of generating a hybridized radio map based on the first radio map data and the second radio map data.

DETAILED DESCRIPTION OF EXAMPLE EMBODIMENTS OF THE INVENTION

Figure 1:
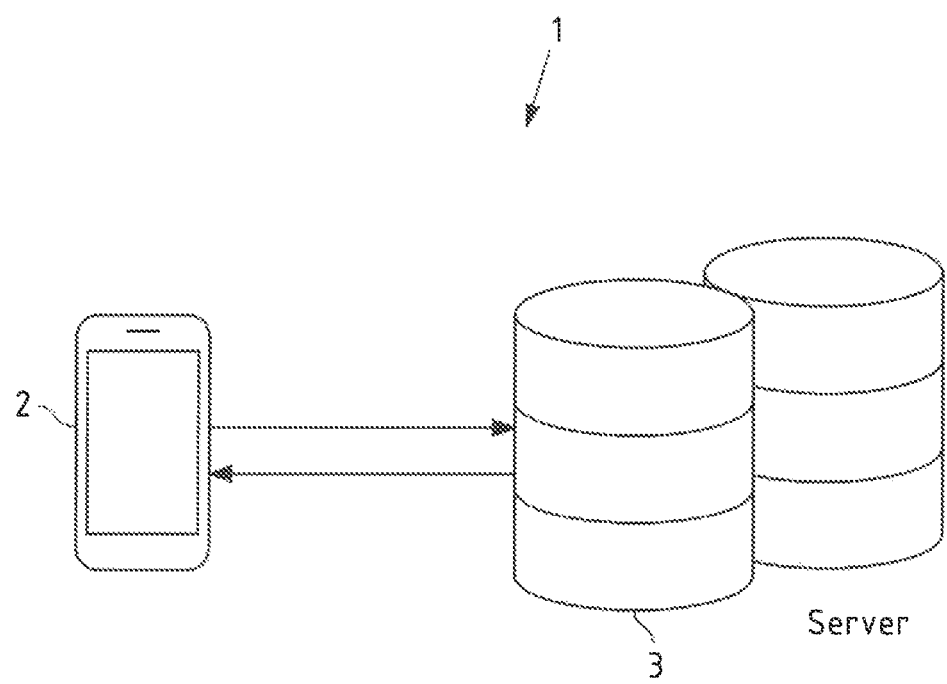
FIG. 1 is a block diagram of a system with exemplary apparatuses according to the invention.

FIG. 1 is a block diagram of a system 1 of a mobile device 2 and a server 3, which may both be exemplary embodiments of an apparatus according to the invention and which may separately or together perform exemplary embodiments of the method according to the invention. The details of mobile device 2 and server 3 are described with respect to FIG. 2, which is an exemplary block diagram of the mobile device 2 of FIG. 1, and FIG. 3, which is an exemplary block diagram of the server 3 of FIG. 1.

For instance, the mobile device 2 may be a part of or may be a cellular phone, a personal digital assistant, a laptop computer, a tablet computer or a wearable.

In particular, mobile device 2 may be used for taking radio measurements and obtaining position estimates of the mobile device. Therein, the mobile device may automatically obtain the radio measurements and the position estimate so as to take part in a crowdsourcing process with a very large plurality of other mobile devices. Alternatively, the mobile device 2 obtains position estimates through manual inputs of the user of the mobile device 2. While in this case also a plurality of mobile devices is preferably involved, the number of devices is significantly smaller than for instance in a crowdsourcing process. Thus, mobile device 2 is an exemplary device used for either manually collecting radio fingerprints or crowdsourcing radio fingerprints (and thus radio map data). Thus, mobile device 2 may support generating and updating a radio map. The mobile device 2 may sent the collected fingerprints to server 3, which obtains the fingerprints (as an example of radio map data) and may generate radio maps (as another example of radio map data) and specifically hybridized radio maps as described herein. Also, mobile device 2 may be seen as an example of a device which may be positioned based on a hybridized radio map as described herein. For this, the mobile device may likewise observe and measure its radio environment. Based on such measurements and a hybridized radio map, the mobile device 2 and/or the server 3 may then be able to determine the position of the mobile device 2.

Server 3 may be a server located remote from mobile device 2. Server 3 may also comprise multiple devices and/or may be realized as a computer cloud, for instance. Server 3 may in particular store manually collected and crowdsourced radio fingerprints received from mobile devices, such as mobile device 2. Server 3 may in particular generate and update radio maps. Also server 3 may distribute generated radio maps to mobile devices or determine positioning estimates of mobile devices based on generated radio maps.

Figure 2:
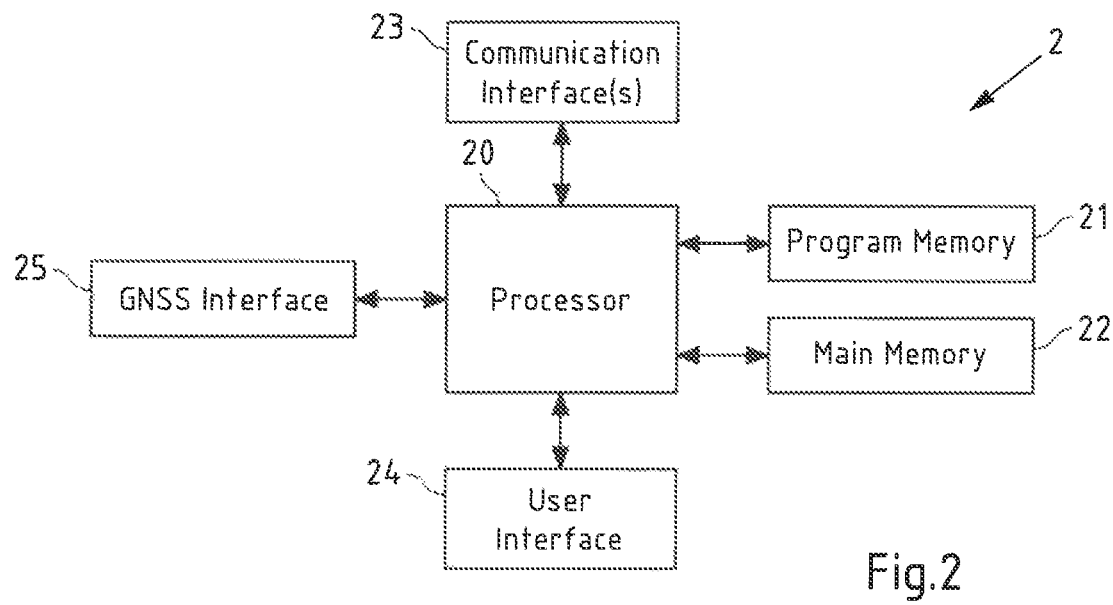
FIG. 2 is a block diagram of an exemplary apparatus according to the different aspects of the invention.

Turning now to FIG. 2, the mobile device 2 may generally be configured to automatically determine position information, e.g. based on signals from a Global Navigation Satellite System (GNSS), so as to be able to take part in crowdsourcing (second) radio fingerprints along with other mobile devices. Such a determination may still be challenging, in particular for indoor situations. For instance, there may be no reception of GNSS signals, the GNSS signals may be too weak in order to get reliable location information or the GNSS signals may suggest a reliable position estimate while in fact the quality is poor.

At the same time, mobile device 2 can be considered an example device of a plurality of devices for manually collecting (first) radio fingerprints. For this, a user of mobile device 2 may manually input position information into mobile device 2, e.g. via input means such as a touch screen or a keyboard.

In any case, mobile device 2 is also capable of taking radio measurements of its radio environment. Together with the position information, the radio measurements may be comprised by respective radio fingerprints. These and other capabilities of the mobile device 2 will also be described below.

The mobile device 2 comprises a processor 20. Processor 20 may represent a single processor or two or more processors, which are for instance at least partially coupled, for instance via a bus. Processor 20 executes a program code stored in program memory 21 (for instance program code causing mobile device 2 to perform embodiments of the method according to the invention (or parts thereof), when executed on processor 20), and interfaces with a main memory 22. Some or all of memories 21 and 22 may also be included into processor 20. One of or both of memories 21 and 22 may be fixedly connected to processor 20 or at least partially removable from processor 20, for instance in the form of a memory card or stick. Program memory 21 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Program memory 21 may also comprise an operating system for processor 20. Program memory 21 may for instance comprise a first memory portion that is fixedly installed in mobile device 2, and a second memory portion that is removable from mobile device 2, for instance in the form of a removable SD memory card. Main memory 22 may for instance be a volatile memory. It may for instance be a RAM or DRAM memory, to give but a few non-limiting examples. It may for instance be used as a working memory for processor 20 when executing an operating system and/or programs. One or more radio fingerprints that are observed by mobile device 2 may for instance be stored in program memory 21 and or main memory 22.

Processor 20 further controls a communication interface 23 configured to receive and/or output information. For instance, communication interface 23 may be configured to send and/or receive data to/from server 3. Mobile device 2 may be configured to communicate with server 3 of system 1 (see FIG. 1). This may for instance comprise sending information such as radio fingerprints observed by the mobile device 2 to server 3. The communication may for instance be based on a (e.g. partly) wireless connection. The communication interface 23 may thus comprise circuitry such as modulators, filters, mixers, switches and/or one or more antennas to allow transmission and/or reception of signals, e.g. for the communication with server 3. In embodiments of the invention, communication interface 23 is inter alia configured to allow communication according to a 2G, 3G, 4G and/or 5G cellular communication system and/or a non-cellular communication system, such as for instance a WLAN network. Nevertheless, the communication route between mobile device 2 and server 3 may equally well at least partially comprise wire-bound portions. For instance, server 3 may be connected to a back-bone of a wireless communication system (associated with mobile terminal 2) via a wire-bound system such as for instance the internet.

Processor 20 further controls a user interface 24 configured to present information to a user of mobile device 20, such as a position estimate, and/or to receive information from such a user, such as manually input position fixes or the like. User interface 24 may for instance be the standard user interface via which a user of mobile device 2 controls other functionality thereof, such as making phone calls, browsing the Internet, etc.

Processor 20 may further control a GNSS interface 25 configured to receive positioning information, that is in particular (absolute) vertical and/or horizontal position information, of an GNSS such as Global Positioning System (GPS), Galileo, Global Navigation Satellite System (i.e. "Globalnaja Nawigazionnaja Sputnikowaja Sistema", GLO-NASS) and Quasi-Zenith Satellite System (QZSS).

The components 21-25 of mobile device 2 may for instance be connected with processor 20 by means of one or more serial and/or parallel busses.

Figure 3:
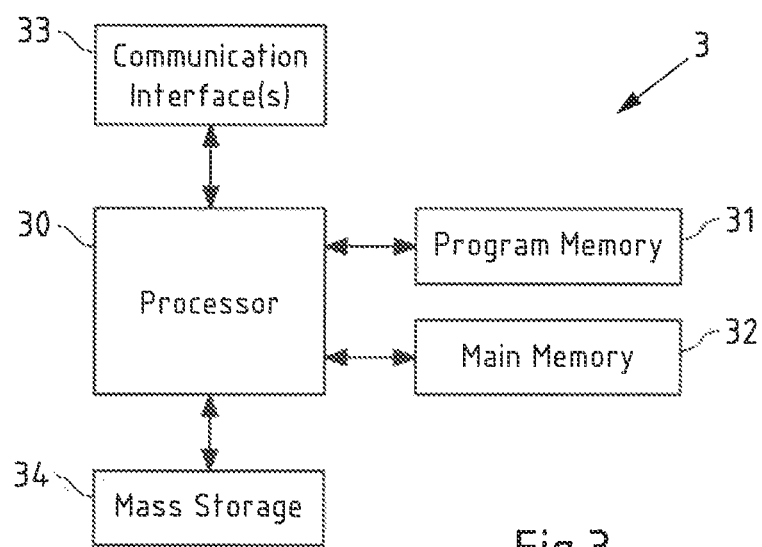
FIG. 3 is a block diagram of an exemplary mobile device according to the different aspects of the invention.

Turning now to FIG. 3, an exemplary block diagram of server 3 of FIG. 1 is shown. Similarly to FIG. 2, server 3 comprises a processor 30. Processor 30 may represent a single processor or two or more processors, which are for instance at least partially coupled, for instance via a bus. Processor 30 executes a program code stored in program memory 31 (for instance program code causing server 3 to perform embodiments of the method according to the invention (or parts thereof), when executed on processor 30). Processor 30 further interfaces with a main memory 32 (for instance acting as a working memory) and a mass storage 34, which may for instance receive and store a plurality of radio fingerprints (specifically first radio fingerprints as well as second radio fingerprints) acquired by mobile devices (such as mobile device 2).

Processor 30 further controls a communication interface 33 configured to receive and/or output information. For instance, server 3 may be configured to communicate with mobile device 2 of system 1, as already described with respect to FIGS. 1 and 2.

In the following an example is explained in more detail, in which first radio map data is based on manually collected data on the one hand and second radio map data is based on crowdsourced data on the other hand. It is explained why the described approach is advantageous specifically for combining these two different types radio map data or radio map data acquired through these two different sources or techniques.

If both manually collected and crowd-sourced radio map data is to be used for a radio map, this approach is only more-or-less problem-free, when some regions are covered exclusively by manually collected radio map data and other regions are exclusively covered by crowdsourced radio map data. However, due to the nature of crowdsourcing (e.g. hundreds of millions of devices are collecting radio map data in various place), it is to be expected that crowdsourced radio map data will also be available for regions with manually collected radio map data. If both types of radio map data shall be used, it needs to be decided to handle the data. Specifically, problems arise due to the different nature of these two kinds of data, i.e. manually collected and crowdsourced radio map data differ from each other fundamentally:

1. Manually collected radio map data is typically highly accurate, noise-free and complete (covering the whole region, building or floor) due to the manual input or human-in-the-loop approach. In contrast, crowdsourced data is typically noisy and has patchy spatial coverage.
2. Manually collected radio map data often has identifiable building information, because the radio map data is typically referenced to an indoor map. Crowdsourced data, in contrast, may be unaware of any structures or buildings—for crowdsourced radio map data a building represents itself only as a multilayer radio map. Hence, matching manually collected radio map data from a specific building to radio map data crowdsourced from the same building is not trivial.
3. Manually collected radio map data has latitude and longitude coordinates that depend upon the alignment of the local indoor map to global latitude and longitude coordinates. This alignment does not always match accurately with the true coordinates of the building. Crowdsourced radio map data, on the other hand, typically obtains its position information directly from a global navigation satellite system (GNSS), so that these coordinates are in line with the true global coordinates. Similarly to point 2 above, this aspect makes identifying manually collected radio map data with crowdsourced radio map data from the same region or building quite challenging.
4. Manually collected radio map data is normally referenced to identifiable floor indices (e.g. 0, 1, 2, . . . ), while crowdsourcing works in the continuous altitude domain (e.g. 100, 103, 106, 109, . . . meters above mean sea level or a reference ellipsoid, e.g. WGS-84). Hence, matching manually collected radio map data from a specific floor in a building to radio map data crowdsourced from the same floor in the same building is not trivial.
5. Manually collected radio map data degrades over time: When radio nodes (WLAN access points, BLUETOOTH beacons, . . . ) get replaced, the generated radio map and the reality do not correspond to each other anymore resulting in degraded positioning performance, until a new manual radio map data collection is performed. In contrast, with crowdsourcing radio map data is continuously obtained from all regions and buildings to ensure that radio map data is maximally up-to-date at any given time.

In particular because of the noise mentioned under point 1, the lack of explicit building information in the crowdsourced radio map data mentioned under point 2 and the coordinate system mismatch mentioned under point 3, the coordinates of one data set must be mapped to the coordinates of the other data set.

Therefore, the most crucial task is to find the coordinate transformation between the coordinate system of the manually collected radio map data (e.g. the indoor map coordinate system with "Lat", "Lon", "Floor") and the coordinate system of the crowdsourced radio map data (e.g. the global coordinate system, e.g. GNSS coordinates: "Lat*", "Lon*", "Altitude"). After the transformation between the two coordinate systems is found, the data sets can be merged.

Figure 4:
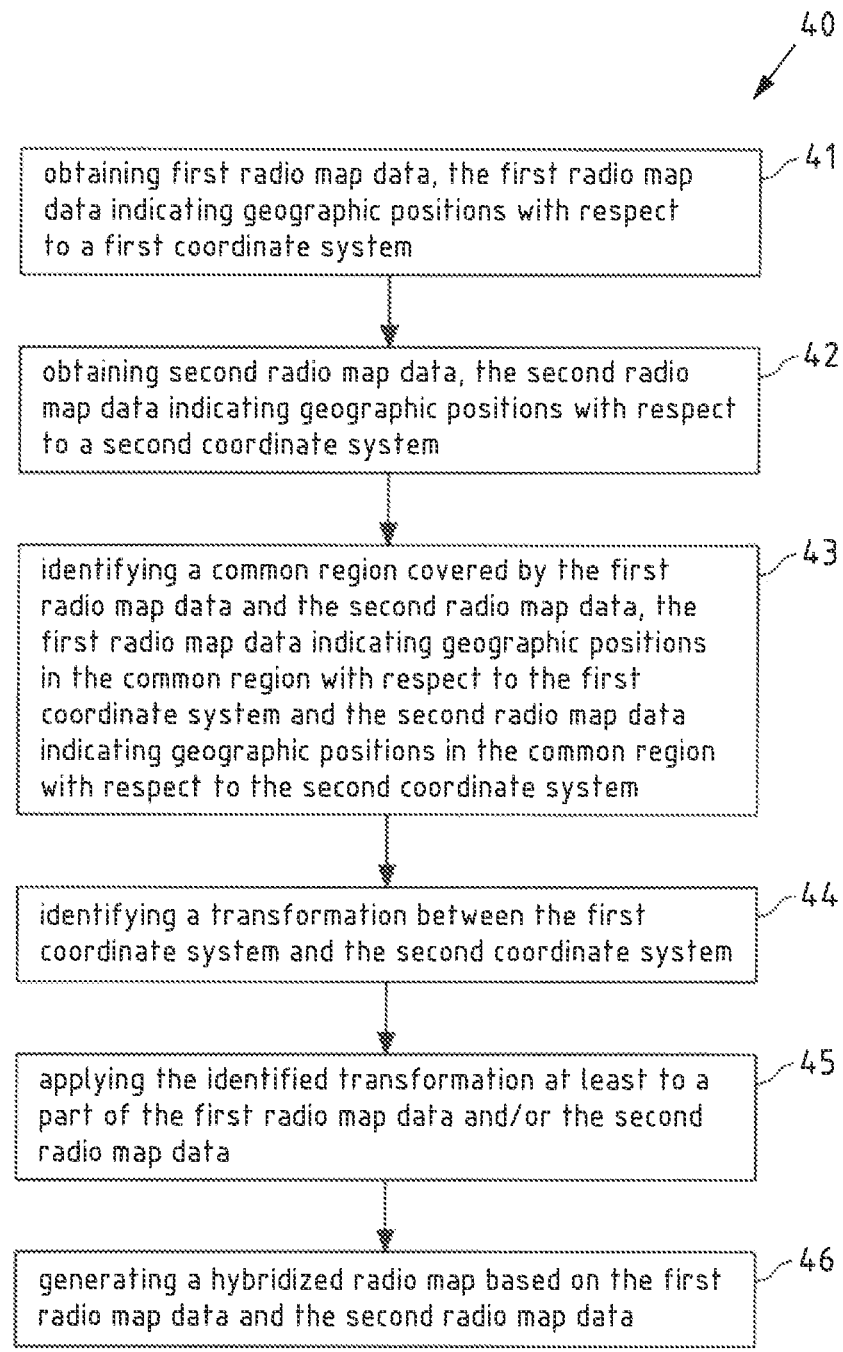
FIG. 4 is a flow chart illustrating an example embodiment of a method according to the invention.

In more detail, the two radio map data sets or radio maps can be merged with the following method, which is explained with reference to FIG. 4, which is a flow chart 40 illustrating an example embodiment of a method according to the invention:

1. Firstly, first radio map data indicating geographic positions with respect to a first coordinate system and second radio map data indicating geographic positions with respect to a second coordinate system are obtained (actions 41, 42). Then those regions or buildings are identified (action 43), for which both manually collected and crowdsourced radio map data is present in the following way:
   It is iterated over all the buildings with manually collected radio map data and the following two actions are performed:
   1.A For each building extract the set of radio node identities (e.g. WI-FI APs and/or BLUETOOTH beacon identities) present in the manually collected radio map data for the building.
   1.B Find the match for the identities in the crowdsourced radio map data. When a large cluster of matching radio node identities is found, then the crowdsourced radio map data has data for a building for which also manually collected radio map data is present.
2. Secondly, the building-specific coordinate transformation is found and the radio map data sets are combined.
   For each building identified in the first step the following actions are performed:
   2.A Find the same radio nodes (e.g. WI-FI APs and/or BLUETOOTH beacons) from both the manually collected and crowdsourced radio map data sets. Identify features or patterns that are present in both radio maps. Such patterns may be measured or estimated radio node locations, signal strength field patterns, coverage areas, etc. The common feature can also include altitude map patterns. This can be done if there is a crowd-sourced multi-layer altitude map that contains a multi-layer radio map with a similar shape and/or number of layers as the manually collected radio map data. E.g. if corner points of the building can be found in both radio maps, these points can readily be used as the shared points in the following step.
   2.B Using the coordinates of the shared features, find a transformation (action 44) between the two coordinate systems, i.e. the transformation that optimally maps a position from the manually collected radio map data coordinate system (e.g. "Lat", "Lon", "Floor") to the crowdsourced radio map data coordinate system ("Lat*", "Lon*", "Altitude") or vice versa. For example, the least-squares method can be used to find the coordinate transformation (e.g. a 2×2 transformation matrix and 2×1 translation vector in 2D case) between the two coordinate systems as soon as there are enough identified shared coordinate points.
   2.C Perform the coordinate transformation (action 45) to one of the radio map data sets so that all the radio map data reside in the same coordinate system. For example, as shown in FIG. 4A, an identified transformation T can be applied to an element $D_{M1_j}$ of first radio map data set $\{D_{M1_j}\}$, which is provided with respect to coordinates M1 of the first radio map data set, to generate a transformed element $D'_{M1_j}$, which is expressed in coordinates M2 of the second radio map data set.
   2.D Merge the two radio map data sets (action 46). Examples of actions include:
      2.D.1 Extend the manually collected radio map data with the crowdsourced radio map data to increase coverage. It may be that not all the sections of the region or building are covered with manual radio map data. Extending the manually collected radio map data with crowdsourced data can fill these coverage gaps, though with lesser accuracy.
      2.D.2 Insert the manually collected radio map data to the crowdsourced radio map data to increase the accuracy. The final radio map will have the best accuracy in the areas with manually collected radio map data.
   In both 2.D.1 and 2.D.2 the end state is a radio map that has the best achievable coverage and the best achievable accuracy. For example, FIG. 4B illustrated that a function F may be applied to the transformed elements $D'_{M1_j}$ of the first radio map data set and to the elements $D_{M2_j}$ of the second radio map data set and the merging and/or combining thereof generates a hybridized radio map RM.

As a result, manually collected radio maps and crowdsourced radio maps can be hybridized. Therein, the crowdsourcing is used to cover a large number of buildings with rough (e.g. 15-meter median accuracy, 70% floor detection rate) indoor positioning capability. The manually collected radio map data can be used as a seed for crowdsourcing and to enable high accuracy (e.g. <5-meter median accuracy, 95% floor detection rate), especially for indoor positioning in selected areas/buildings/floors. The described approach combines and modifies the radio map data from two data sources in such a way that the data is compatible and up-to-date.

Figure 5:
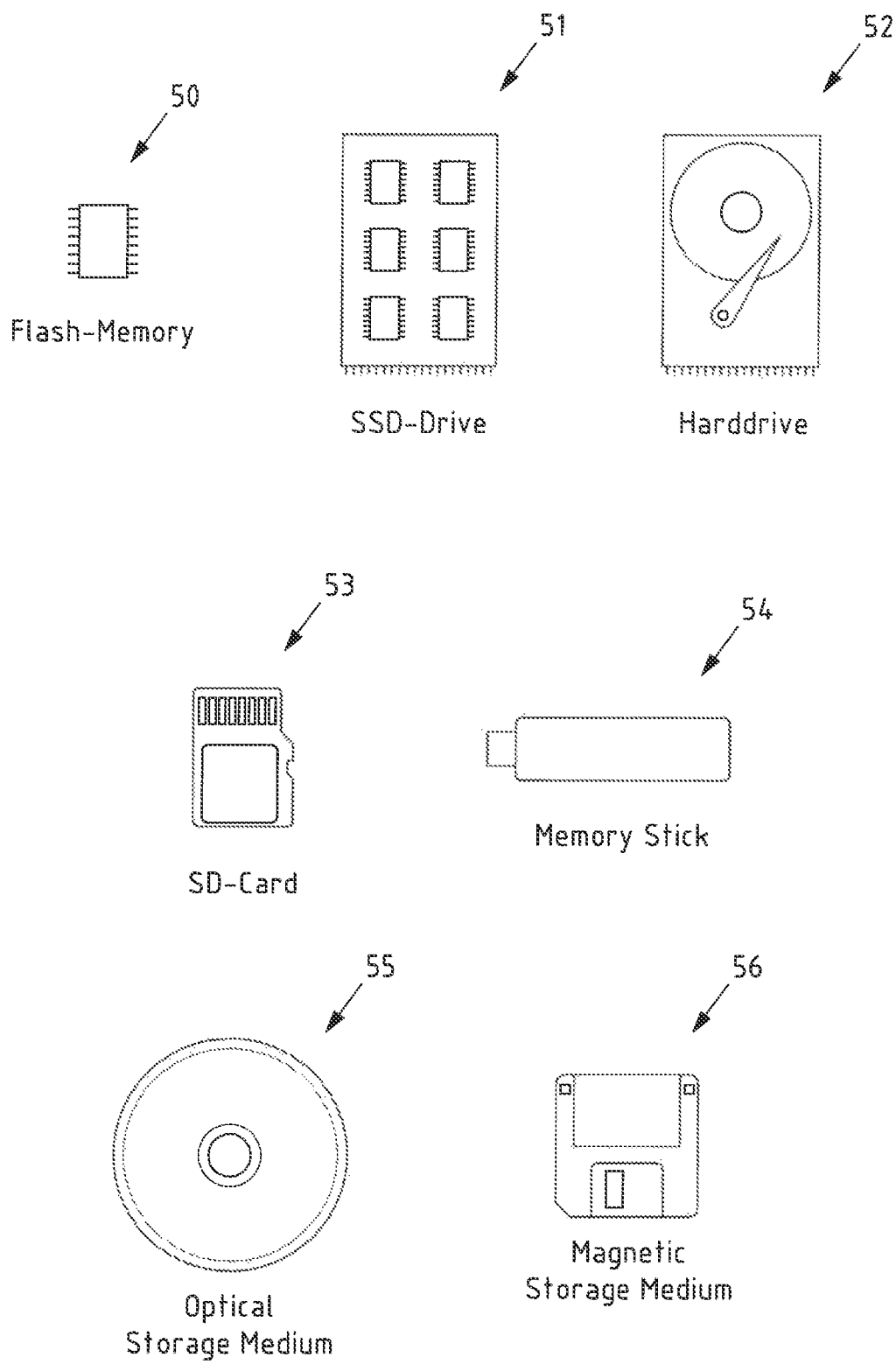
FIG. 5 is a schematic illustration of examples of tangible storage media according to the invention.

FIG. 5 is a schematic illustration of examples of tangible storage media according to the present invention that may for instance be used to implement program memory 21 of FIG. 2 and/or program memory 31 of FIG. 3. To this end, FIG. 5 displays a flash memory 50, which may for instance be soldered or bonded to a printed circuit board, a solid-state drive 51 comprising a plurality of memory chips (e.g. Flash memory chips), a magnetic hard drive 52, a Secure Digital (SD) card 53, a Universal Serial Bus (USB) memory stick 54, an optical storage medium 55 (such as for instance a CD-ROM or DVD) and a magnetic storage medium 56.

The following embodiments are also disclosed:

Embodiment 1

Method, performed by at least one apparatus, the method comprising:
   obtaining (41) first radio map data, the first radio map data indicating geographic positions with respect to a first coordinate system;
   obtaining (42) second radio map data, the second radio map data indicating geographic positions with respect to a second coordinate system;

identifying (44) a transformation between the first coordinate system and the second coordinate system; and applying (45) the identified transformation at least to a part of the first radio map data and/or the second radio map data.

Embodiment 2

Method according to embodiment 1, wherein the first radio map data at least in part is based on manually collected data and wherein the second radio map data at least in part is based on crowdsourced data.

Embodiment 3

Method according to embodiment 1 or 2, wherein the first radio map data is based on first radio fingerprints and wherein the second radio map data is based on second radio fingerprints.

Embodiment 4

Method according to embodiment 3, wherein the first radio fingerprints comprise first radio measurements and position information indicating geographic positions at which the first radio measurements were taken with respect to the first coordinate system; and wherein the second radio fingerprints comprise second radio measurements and position information indicating geographic positions at which the second radio measurements were taken with respect to the second coordinate system.

Embodiment 5

Method according to embodiment 4, wherein the first radio measurements and/or the second radio measurements each comprise one or more of
- an identifier of a radio node emitting an observed radio signal;
- information on a received signal strength of an observed radio signal;
- information on path losses of an observed radio signal;
- information on a timing measurement of an observed radio signal; and/or
- information on an angle of arrival of an observed radio signal.

Embodiment 6

Method according to embodiment 4 or 5, wherein the position information of the first radio fingerprints and/or of the second radio fingerprints comprise one or more of
- horizontal position information;
- vertical position information;
- information representative of a latitude;
- information representative of a longitude;
- information representative of an altitude; and/or
- information representative of a floor index.

Embodiment 7

Method according to any of the preceding embodiments, wherein the first radio map data enables estimating a geographic position of a mobile device at least in part with a higher accuracy than the second radio map data.

Embodiment 8

Method according to any of the preceding embodiments, wherein the first coordinate system and the second coordinate system use global coordinates.

Embodiment 9

Method according to any of the preceding embodiments, wherein the method further comprises:
identifying (43) a common region covered by the first radio map data and the second radio map data, the first radio map data indicating geographic positions in the common region with respect to the first coordinate system and the second radio map data indicating geographic positions in the common region with respect to the second coordinate system.

Embodiment 10

Method according to embodiment 9, wherein identifying of a common region covered by the first radio map data and the second radio map data comprises comparing radio node identifiers from the first radio map data with radio node identifiers from the second radio map data.

Embodiment 11

Method according to any of the preceding embodiments, wherein identifying a transformation between the first coordinate system and the second coordinate system comprises identifying a common feature present in the first radio map data and the second radio map data.

Embodiment 12

Method according to embodiment 11, wherein the common feature is a spatial or geographic feature and in particular pertains to one or more of:
- one or more radio node locations;
- one or more signal strength fields;
- one or more radio coverage areas; and/or
- one or more altitude maps.

Embodiment 13

Method according to any of the preceding embodiments, wherein identifying a transformation between the first coordinate system and the second coordinate system comprises a mathematical optimization method.

Embodiment 14

Method according to any of the preceding embodiments, wherein the method further comprises:
generating (46) a hybridized radio map based on the first radio map data and the second radio map data.

Embodiment 15

An apparatus comprising means for performing a method according to any of embodiments 1 to 14.

Embodiment 16

A computer program code, the computer program code, when executed by a processor, causing an apparatus to perform the method of any of the embodiments 1 to 14.

Embodiment 17

A non-transitory computer readable storage medium, in which computer program code is stored, the computer program code when executed by a processor causing at least one apparatus to perform the method of any of embodiments 1 to 14.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors of FIGS. 2 and 3, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

That which is claimed is:

1. A method, performed by at least one apparatus, the method comprising:
    obtaining first radio map data, the first radio map data indicating geographic positions with respect to a first coordinate system;
    obtaining second radio map data, the second radio map data indicating geographic positions with respect to a second coordinate system;
    identifying a transformation between the first coordinate system and the second coordinate system, wherein identifying the transformation between the first coordinate system and the second coordinate system comprises at least identifying a common feature present in both the first radio map data and the second radio map data; and
    applying the identified transformation at least to a part of the first radio map data and/or the second radio map data.

2. The method according to claim 1, wherein the first radio map data at least in part is based on manually collected data and wherein the second radio map data at least in part is based on crowdsourced data.

3. The method according to claim 1, wherein the first radio map data is based on first radio fingerprints and wherein the second radio map data is based on second radio fingerprints.

4. The method according to claim 3, wherein the first radio fingerprints comprise first radio measurements and position information indicating geographic positions at which the first radio measurements were taken with respect to the first coordinate system; and
    wherein the second radio fingerprints comprise second radio measurements and position information indicating geographic positions at which the second radio measurements were taken with respect to the second coordinate system.

5. The method according to claim 4, wherein the first radio measurements and/or the second radio measurements each comprise one or more of
    an identifier of a radio node emitting an observed radio signal;
    information on a received signal strength of an observed radio signal;
    information on path losses of an observed radio signal;
    information on a timing measurement of an observed radio signal; and/or
    information on an angle of arrival of an observed radio signal.

6. The method according to claim 4, wherein the position information of the first radio fingerprints and/or of the second radio fingerprints comprise one or more of
    horizontal position information;
    vertical position information;
    information representative of a latitude;
    information representative of a longitude;
    information representative of an altitude; and/or
    information representative of a floor index.

7. The method according to claim 1, wherein the first radio map data enables estimating a geographic position of a mobile device at least in part with a higher accuracy than the second radio map data.

8. The method according to claim 1, wherein the first coordinate system and the second coordinate system use global coordinates.

9. The method according to claim 1, wherein the method further comprises:
identifying a common region covered by the first radio map data and the second radio map data, the first radio map data indicating geographic positions in the common region with respect to the first coordinate system and the second radio map data indicating geographic positions in the common region with respect to the second coordinate system.

10. The method according to claim 9, wherein identifying of a common region covered by the first radio map data and the second radio map data comprises comparing radio node identifiers from the first radio map data with radio node identifiers from the second radio map data.

11. The method according to claim 1, wherein the common feature is a spatial or geographic feature and in particular pertains to one or more of:
one or more radio node locations;
one or more signal strength fields;
one or more radio coverage areas; and/or
one or more altitude maps.

12. The method according to claim 1, wherein identifying a transformation between the first coordinate system and the second coordinate system comprises a mathematical optimization method.

13. The method according to claim 1, wherein the method further comprises:
generating a hybridized radio map based on the first radio map data and the second radio map data.

14. The method of claim 1, wherein identifying the transformation further comprises identifying the transformation based on the identified common feature.

15. An apparatus comprising at least one processor and at least one memory including computer program code, the at least one memory and the computer program code configured to, with the at least one processor, cause the apparatus to at least:
obtain first radio map data, the first radio map data indicating geographic positions with respect to a first coordinate system;
obtain second radio map data, the second radio map data indicating geographic positions with respect to a second coordinate system;
identify a transformation between the first coordinate system and the second coordinate system, wherein identifying the transformation between the first coordinate system and the second coordinate system comprises at least identifying a common feature present in both the first radio map data and the second radio map data; and
apply the identified transformation at least to a part of the first radio map data and/or the second radio map data.

16. The apparatus according to claim 15, wherein the first radio map data is based on first radio fingerprints and the second radio map data is based on second radio fingerprints, wherein the first radio fingerprints comprise first radio measurements and position information indicating geographic positions at which the first radio measurements were taken with respect to the first coordinate system, and wherein the second radio fingerprints comprise second radio measurements and position information indicating geographic positions at which the second radio measurements were taken with respect to the second coordinate system.

17. The apparatus according to claim 15, wherein the at least one memory and the computer program code are further configured to, with the at least one processor, cause the apparatus to:
identify a common region covered by the first radio map data and the second radio map data, the first radio map data indicating geographic positions in the common region with respect to the first coordinate system and the second radio map data indicating geographic positions in the common region with respect to the second coordinate system.

18. The apparatus according to claim 15, wherein the first radio map data at least in part is based on manually collected data and wherein the second radio map data at least in part is based on crowdsourced data.

19. The apparatus of claim 15, wherein identifying the transformation further comprises identifying the transformation based on the identified common feature.

20. A non-transitory computer readable storage medium, in which computer program code is stored, the computer program code, when executed by a processor, causes at least one apparatus to:
obtain first radio map data, the first radio map data indicating geographic positions with respect to a first coordinate system;
obtain second radio map data, the second radio map data indicating geographic positions with respect to a second coordinate system;
identify a transformation between the first coordinate system and the second coordinate system, wherein identifying the transformation between the first coordinate system and the second coordinate system comprises at least identifying a common feature present in both the first radio map data and the second radio map data; and
apply the identified transformation at least to a part of the first radio map data and/or the second radio map data.

* * * * *